United States Patent
Whitehead

(10) Patent No.: US 9,612,501 B2
(45) Date of Patent: Apr. 4, 2017

(54) METHOD AND APPARATUS FOR FRONT-LIT SEMI-RETRO-REFLECTIVE DISPLAY

(71) Applicant: CLEARink Displays LLC, Santa Clara, CA (US)

(72) Inventor: Lorne A. Whitehead, Vancouver (CA)

(73) Assignee: CLEARink Displays, Inc., Santa Clara, CA (US)

( * ) Notice: Subject to any disclaimer, the term of this patent is extended or adjusted under 35 U.S.C. 154(b) by 0 days.

(21) Appl. No.: 14/500,737

(22) Filed: Sep. 29, 2014

(65) Prior Publication Data

US 2015/0146273 A1    May 28, 2015

Related U.S. Application Data

(60) Provisional application No. 61/884,854, filed on Sep. 30, 2013.

(51) Int. Cl.
| | |
|---|---|
| G02B 26/00 | (2006.01) |
| G02F 1/167 | (2006.01) |
| G02B 5/12 | (2006.01) |
| G02F 1/1343 | (2006.01) |
| G02F 1/136 | (2006.01) |

(Continued)

(52) U.S. Cl.
CPC ............. *G02F 1/167* (2013.01); *G02B 5/12* (2013.01); *G02F 1/136* (2013.01); *G02F 1/1336* (2013.01); *G02F 1/13439* (2013.01); *G02F 1/133553* (2013.01); *G02B 5/136* (2013.01); *G02F 1/315* (2013.01); *G02F 2001/133616* (2013.01); *G02F 2001/1672* (2013.01); *G02F 2001/1676* (2013.01)

(58) Field of Classification Search
CPC ............. G02F 1/167; G02F 2001/1676; G02F 2001/1672; G02F 1/13439; G02F 1/315; G02F 1/1336; G02F 1/136; G02F 2001/133616; G02F 1/133553; G02B 5/12; G02B 5/136
USPC .............................................. 359/222.1, 296
See application file for complete search history.

(56) References Cited

U.S. PATENT DOCUMENTS

| | | | |
|---|---|---|---|
| 3,919,031 | A | 11/1975 | White |
| 4,025,674 | A | 5/1977 | Mizuochi |

(Continued)

FOREIGN PATENT DOCUMENTS

| | | |
|---|---|---|
| AT | 333109 T | 8/2006 |
| CA | 2292441 C | 7/2002 |

(Continued)

OTHER PUBLICATIONS

US 5,822,783, 11/2004, Matsuda et al. (withdrawn)

(Continued)

*Primary Examiner* — James Phan
(74) *Attorney, Agent, or Firm* — Dianoosh Salehi

(57) ABSTRACT

The disclosure generally relates to a front-lit display having transparent and selectively emissive light directionality. The disclosed semi-retro-reflective, semi-specular and specular displays include directional front light systems that reflect light in a manner to preserve the non-Lambertian characteristic of the light output. This leads to brighter displays with a higher degree of luminance as compared to conventional microencapsulated electrophoretic displays with substantially Lambertian reflectance where much of the light is not reflected back towards the viewer.

24 Claims, 8 Drawing Sheets

(51) Int. Cl.
   *G02F 1/315*    (2006.01)
   *G02F 1/1335*   (2006.01)
   *G02B 5/136*    (2006.01)

(56) References Cited

U.S. PATENT DOCUMENTS

| | | | |
|---|---|---|---|
| 4,071,430 A | 1/1978 | Liebert |
| 4,203,106 A | 5/1980 | Dalisa et al. |
| 4,821,092 A | 4/1989 | Noguchi |
| 5,019,748 A | 5/1991 | Appelberg |
| 5,319,491 A | 6/1994 | Selbrede |
| 5,396,350 A | 3/1995 | Beeson et al. |
| 5,596,671 A | 1/1997 | Rowckwell, III |
| 5,871,653 A | 2/1999 | Ling |
| 5,959,777 A | 9/1999 | Whitehead |
| 5,999,307 A | 12/1999 | Whitehead et al. |
| 6,064,784 A | 5/2000 | Whitehead et al. |
| 6,215,920 B1 | 4/2001 | Whitehead et al. |
| 6,304,365 B1 | 10/2001 | Whitehead |
| 6,376,828 B1 | 4/2002 | Comiskey |
| 6,377,383 B1 | 4/2002 | Whitehead et al. |
| 6,384,979 B1 | 5/2002 | Whitehead et al. |
| 6,437,921 B1 | 8/2002 | Whitehead |
| 6,452,734 B1 | 9/2002 | Whitehead et al. |
| 6,574,025 B2 | 6/2003 | Whitehead et al. |
| 6,751,008 B2 | 6/2004 | Liang et al. |
| 6,842,279 B2 | 1/2005 | Amundson |
| 6,865,011 B2 | 3/2005 | Whitehead et al. |
| 6,885,496 B2 | 4/2005 | Whitehead et al. |
| 6,891,658 B2 | 5/2005 | Whitehead et al. |
| 7,046,439 B2 | 5/2006 | Kaminsky et al. |
| 7,093,968 B2 | 8/2006 | Hsueh et al. |
| 7,164,536 B2 | 1/2007 | Whitehead |
| 7,170,670 B2 | 1/2007 | Webber |
| 7,286,280 B2 | 10/2007 | Whitehead et al. |
| 7,324,263 B2 | 1/2008 | Johnson et al. |
| 7,422,964 B2 | 9/2008 | Akiyama |
| 7,439,948 B2 | 10/2008 | Johnson et al. |
| 7,507,012 B2 | 3/2009 | Aylward et al. |
| 7,515,326 B2 | 4/2009 | Ibrede et al. |
| 7,564,614 B2 | 7/2009 | Chen et al. |
| 7,660,509 B2 | 2/2010 | Bryan et al. |
| 7,740,387 B2 | 6/2010 | Schultz et al. |
| 7,760,417 B2 | 7/2010 | Whitehead |
| 7,775,700 B2 | 8/2010 | Lee |
| 7,852,430 B1 | 12/2010 | Gettmey |
| 8,022,615 B2 | 9/2011 | Bai et al. |
| 8,040,591 B2 | 10/2011 | Whitehead |
| 8,094,364 B2 | 1/2012 | Park |
| 8,384,659 B2 | 2/2013 | Yeo et al. |
| 8,587,512 B2 | 11/2013 | Hiji et al. |
| 8,690,408 B2 | 4/2014 | Li |
| 2002/0171910 A1 | 11/2002 | Pullen et al. |
| 2003/0038755 A1 | 2/2003 | Amundson et al. |
| 2003/0067666 A1 | 4/2003 | Kawai |
| 2003/0165016 A1 | 9/2003 | Whitehead et al. |
| 2003/0214697 A1 | 11/2003 | Duthaler et al. |
| 2004/0136047 A1 | 7/2004 | Whitehead et al. |
| 2004/0174584 A1 | 9/2004 | Whitehead et al. |
| 2006/0056009 A1 | 3/2006 | Kornbrekke et al. |
| 2006/0148262 A1 | 7/2006 | Lee et al. |
| 2006/0209418 A1 | 9/2006 | Whitehead |
| 2006/0291034 A1 | 12/2006 | Patry et al. |
| 2007/0008739 A1 | 1/2007 | Kim et al. |
| 2007/0019434 A1 | 1/2007 | Lee |
| 2007/0091434 A1 | 4/2007 | Garner et al. |
| 2007/0263137 A1 | 11/2007 | Shigeta et al. |
| 2008/0174852 A1 | 7/2008 | Hirai et al. |
| 2008/0203910 A1 | 8/2008 | Reynolds |
| 2008/0219024 A1 | 9/2008 | Mi et al. |
| 2008/0231960 A1 | 9/2008 | Van Gorkom et al. |
| 2008/0266245 A1 | 10/2008 | Wilcox et al. |
| 2008/0285282 A1 | 11/2008 | Karman et al. |
| 2008/0297496 A1 | 12/2008 | Watson et al. |
| 2008/0304134 A1 | 12/2008 | Ban |
| 2009/0109172 A1 | 4/2009 | Lee et al. |
| 2009/0201565 A1 | 8/2009 | Bita et al. |
| 2009/0201570 A1 | 8/2009 | Frazier et al. |
| 2009/0225398 A1 | 9/2009 | Duthaler et al. |
| 2009/0262083 A1 | 10/2009 | Parekh |
| 2009/0322669 A1 | 12/2009 | Bryning et al. |
| 2010/0079843 A1 | 4/2010 | Derichs et al. |
| 2010/0085627 A1 | 4/2010 | Whitehead |
| 2010/0091224 A1 | 4/2010 | Cho et al. |
| 2010/0118383 A1 | 5/2010 | Van Abeelen et al. |
| 2010/0148385 A1 | 6/2010 | Balko et al. |
| 2010/0225575 A1 | 9/2010 | Ishii et al. |
| 2011/0043435 A1 | 2/2011 | Hebenstreit et al. |
| 2011/0273906 A1 | 11/2011 | Nichol et al. |
| 2011/0299014 A1 | 12/2011 | Jang et al. |
| 2011/0316764 A1 | 12/2011 | Parry-Jones et al. |
| 2012/0008203 A1 | 1/2012 | Ijzerman et al. |
| 2012/0019896 A1 | 1/2012 | Yoshida et al. |
| 2012/0069064 A1 | 3/2012 | Yamakita |
| 2012/0081777 A1 | 4/2012 | Heikenfeld et al. |
| 2012/0113367 A1 | 5/2012 | Kitson et al. |
| 2012/0113499 A1 | 5/2012 | Komatsu |
| 2012/0293857 A1 | 11/2012 | Kwon et al. |
| 2013/0182311 A1 | 7/2013 | Mochizuki et al. |
| 2013/0278995 A1 | 10/2013 | Drzaic et al. |
| 2014/0340376 A1 | 11/2014 | Itagaki et al. |
| 2015/0146273 A1 | 5/2015 | Whitehead |
| 2016/0097961 A1 | 4/2016 | Whitehead |

FOREIGN PATENT DOCUMENTS

| | | |
|---|---|---|
| CA | 2371138 C | 7/2005 |
| CA | 2410955 C | 1/2007 |
| CA | 2474384 C | 8/2010 |
| CA | 2643808 C | 8/2013 |
| CN | 1173208 C | 10/2004 |
| CN | 1454327 A | 9/2008 |
| DE | 69825894 | 9/2005 |
| EP | 1118039 | 2/2003 |
| EP | 0988573 B1 | 8/2004 |
| EP | 1290486 B1 | 10/2004 |
| EP | 1368700 B1 | 7/2006 |
| JP | 3965115 | 6/2007 |
| JP | 2007279641 | 10/2007 |
| JP | 4113843 | 4/2008 |
| JP | 4956610 | 3/2012 |
| KR | 100949412 | 3/2010 |
| WO | WO 2006108285 | 10/2006 |
| WO | 2014146937 | 9/2014 |

OTHER PUBLICATIONS

International Search Report and Written Opinion issued on Dec. 30, 2014 for PCT Application No. PCT/US2014/058118.
International Search Report and Written Opinion issued on Jul. 8, 2014 for PCT Application No. PCT/US13/49606.
International Search Report and Written Opinion issued on Aug. 11, 2014 for PCT Application No. PCT/US14/30966.
International Search Report and Written Opinion issued on Sep. 19, 2014 for PCT Application No. PCT/US14/038091.
International Search Report and Written Opinion issued on Apr. 3, 2015 for PCT Application No. PCT/US2014/061911.
International Search Report and Written Opinion issued on Oct. 1, 2015 for PCT Application No. PCT/US2015/030349.
International Search Report and Written Opinion issued on Mar. 1, 2016 for PCT Application No. PCT/US2015/013725.
International Search Report and Written Opinion issued on Jan. 27, 2016 for PCT Application No. PCT/US2015/054385.
International Search Report and Written Opinion issued on Mar. 2, 2016 for PCT Application No. PCT/US2015/062075.
International Search Report and Written Opinion issued on Mar. 28, 2016 for PCT Application No. PCT/US2015/0066150.
International Search Report and Written Opinion issued on Apr. 13, 2016 for PCT Application No. PCT/US2015/066980.
International Search Report and Written Opinion issued on Apr. 21, 2016 for PCT Application No. PCT/US2016/017416.

(56) References Cited

OTHER PUBLICATIONS

Mossman, M. A. et al., "A Novel Reflective Image Display Using Total Internal Reflection" Displays Devices, Dempa Publications, Tokyo JP vol. 25, No. 5 Dec. 1, 2004 pp. 215-221.

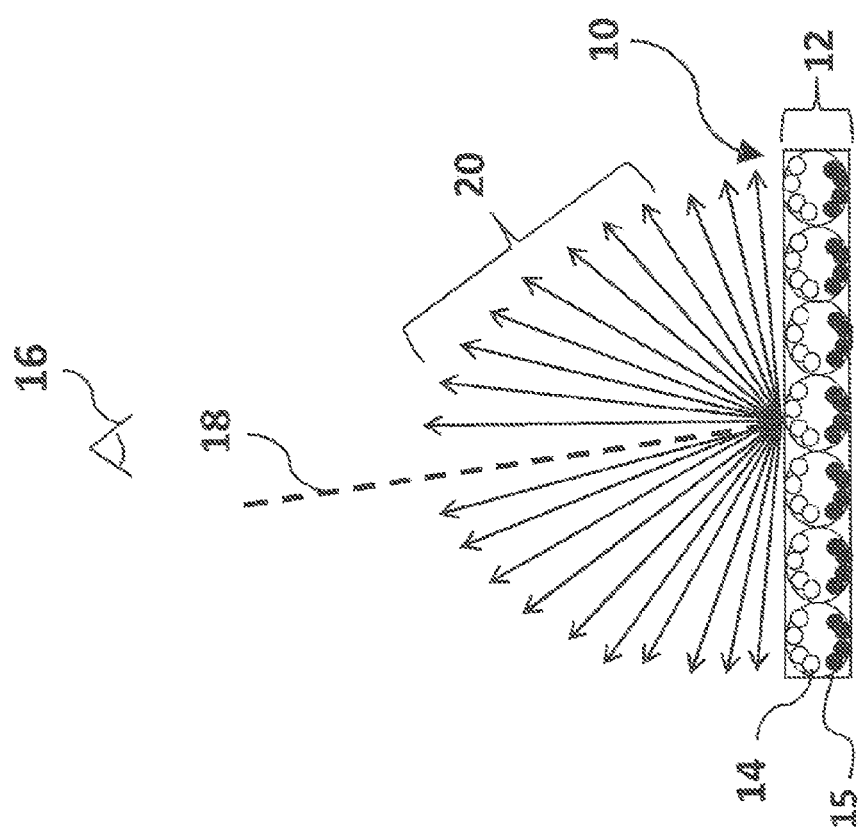

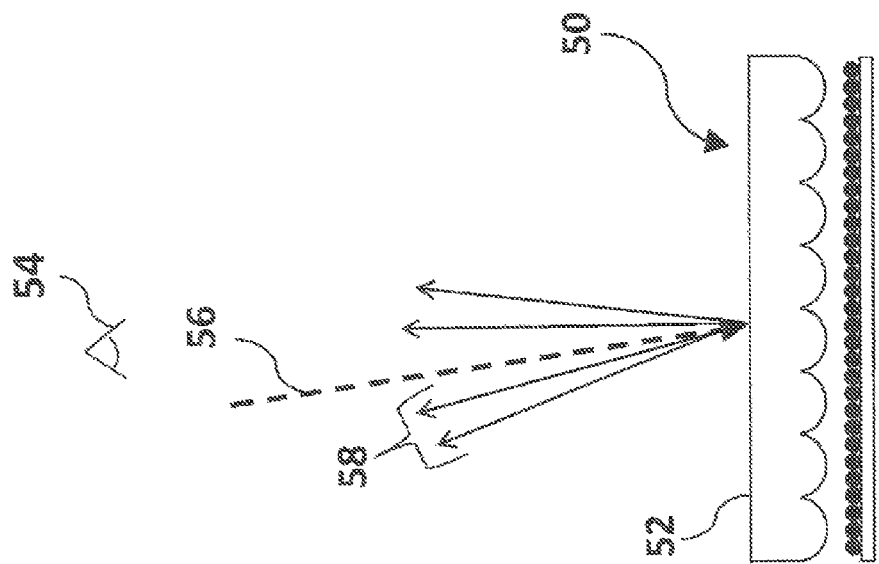

METHOD AND APPARATUS FOR FRONT-LIT SEMI-RETRO-REFLECTIVE DISPLAY

The instant application claims priority to the filing date of Provisional Application No. 61/884,854, filed Sep. 30, 2013; the specification of which is incorporated herein in its entirety.

FIELD

The disclosure relates to front-lit, semi-retro-reflective displays and methods for manufacturing thereof. In one embodiment, the disclosure relates to a front-lit display having transparent and selectively emissive light directionality.

BACKGROUND

Conventional front-lit illuminated microencapsulated electrophoretic displays characteristically reflect light in the white state in a so-called Lambertian manner. The light originating from a front light is radiated equally in all directions with equal luminance in the white state. Thus, a large portion of the reflected light is not reflected back to the viewer thereby limiting the perceived brightness of the display. This is inefficient by about a factor of two, of the perceived luminance to screen exitance where about 50% of the light is reflected away from the viewer.

The light output is different with conventional rear illuminated LCD displays where the emitted light is largely confined to approximately a 30° half-angle cone centered around a direction perpendicular to the plane of the front light. The illuminated LCD displays approximately doubles the ratio of perceived luminance to screen exitance for typical viewing angles. This roughly doubles the battery life. That is, the ratio of perceived luminance to screen exitance increases from 1/p, the value for Lambertian light, to roughly 2/p.

Therefore, in order for broader adoption of reflective displays by the public, there is a need for an improved front-lit, reflective displays having an increased ratio of perceived luminance to exitance which leads to a brighter display.

BRIEF DESCRIPTION OF DRAWINGS

These and other embodiments of the disclosure will be discussed with reference to the following exemplary and non-limiting illustrations, in which like elements are numbered similarly, and where:

FIG. 1A schematically illustrates a conventional microencapsulated electrophoretic type display showing Lambertian reflectance in the white state;

FIG. 1B schematically illustrates a conventional frustratable TIR display with light being substantially reflected back to the viewer in a semi-retro-reflective manner in the white state;

DETAILED DESCRIPTION

Figure 2:
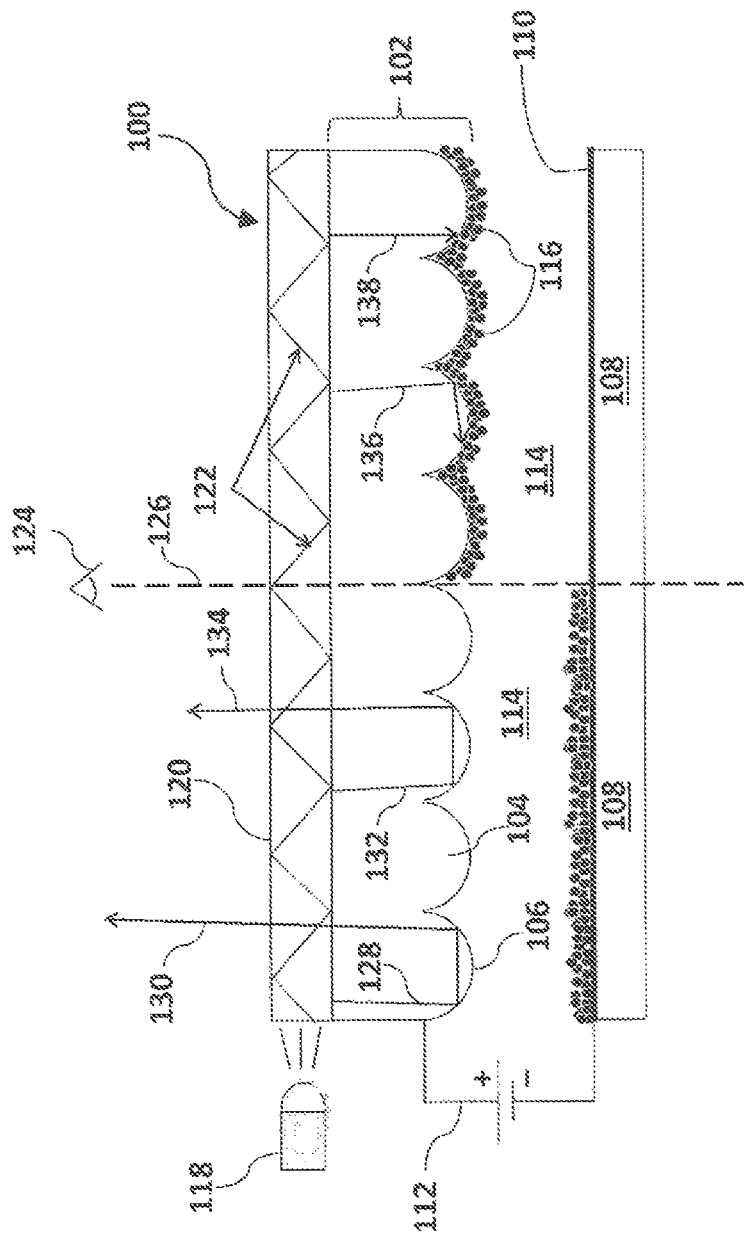
FIG. 2 illustrates a frustratable TIR semi-retro-reflective display according to one embodiment of the disclosure.

FIG. 1A schematically illustrates a conventional microencapsulated electrophoretic type display showing Lambertian reflectance in the white state. Specifically, FIG. 1A shows display 10 having a layer of microcapsules 12 containing light absorbing black particles 15 and light reflecting particles 14. Display 10 is shown in the white or reflective state where light reflecting particles 14 are located at the outward surface of display 10 towards viewer 16. Conventional light reflecting particles include Titanium Dioxide ($TiO_2$).

An incident light beam depicted by dotted ray 18 is shown where the beam is nearly perpendicular to the outward surface of display 10. The light is reflected in all directions in a Lambertian manner as depicted by the multiple light reflection rays 20. As shown in FIG. 1A, a substantial amount of light is not reflected back to the viewer 16.

FIG. 1B schematically illustrates a conventional frustratable TIR display with light being substantially reflected back to the viewer in a semi-retro-reflective manner in the white state. Specifically, FIG. 1B shows a frustratable total internal reflection (TIR) display 50 with a hemispherical beaded front sheet 52. Such displays are disclosed, for example, in U.S. Pat. No. 6,885,496 B2. Display 52 is in the light state when it reflects light in a semi-retro-reflective manner back to viewer 54. An incident light beam depicted by dotted ray 56 in a direction nearly perpendicular to the front surface 52 is reflected back to the viewer 54. When light is reflected in a semi-retro-reflective manner (or in a semi-specular manner), as depicted by reflected light rays 58, a substantial portion of the light is reflected back to the viewer 54. As a result the display has a higher degree of perceived luminance and may appear brighter to the viewer.

Figure 3:
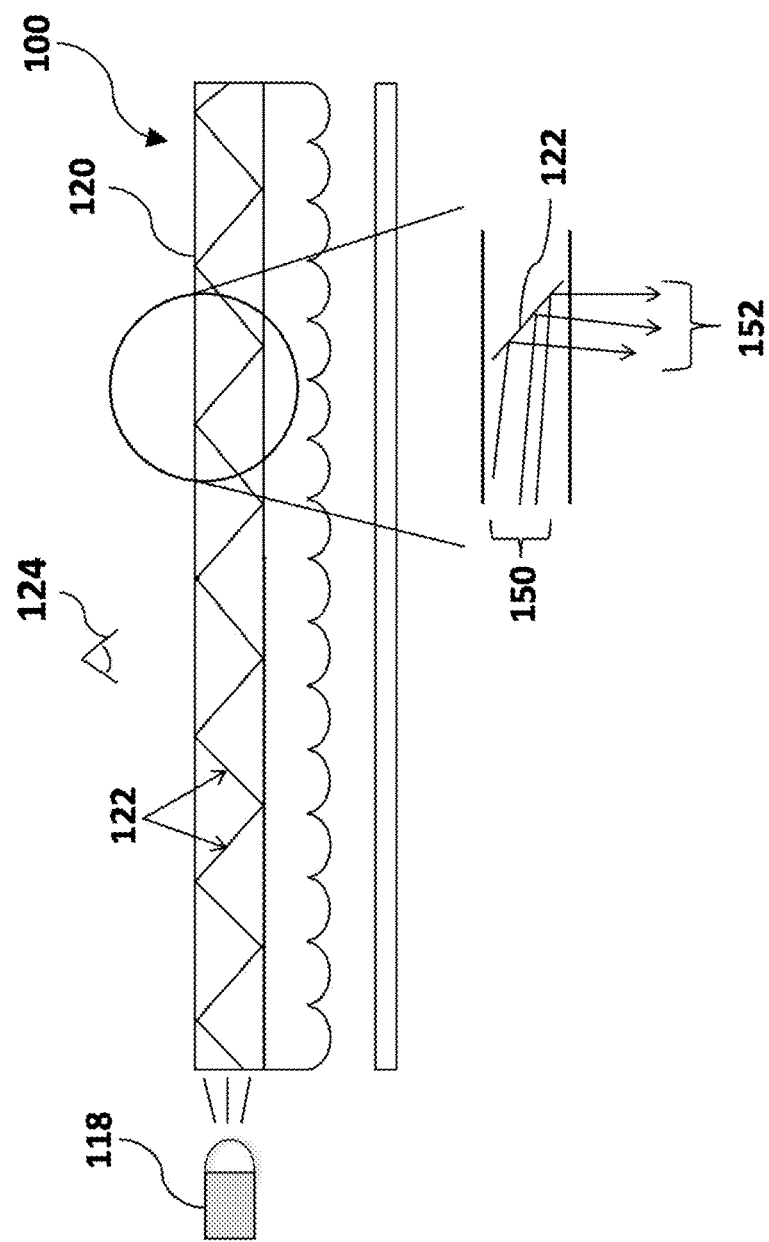
FIG. 3 is a close-up view of light being reflected off the extractor elements within the light guide of a directional front light system in a semi-retro-reflective TIR display.

In one embodiment, the disclosure relates to a display with: (a) a front light that is mainly transparent and selectively emits light directionally at a perpendicular direction relative to the surface of the outward sheet of the display, and (b) a reflective electronic paper surface that has less diffusive characteristic including semi-specular or semi-retro-reflective so as to substantially preserve the non-Lambertian characteristic of the light output in order to maximize the ratio of luminance to exitance. In one embodiment, FIG. 3 shows roughly how light source and light guides work where the light source injects light in a parallel direction to the surface of the outward sheet of the display and into the light guide wherein the light guide then redirects it in a perpendicular direction to the surface of the outward sheet of the display.

In certain embodiments, the disclosure relates to a display formed from a combination of a front light and a reflective electronic paper surface. In an exemplary embodiment, the front light is configured to directionally emit light in a perpendicular direction within a narrow angle with respect to the outward surface of the display.

Conventionally, specular reflection is defined as the mirror-like reflection of light from a surface in which light from a single incoming direction (i.e., a ray) is reflected into a single outgoing direction. This behavior is described by the law of reflection, which states that the direction of incoming light (incident ray), and the direction of outgoing light reflected (reflected ray) make the same angle with respect to the surface normal. That is, the angle of incidence equals the angle of reflection and that the incident, normal, and reflected directions are coplanar. In one embodiment of the disclosure, the electronic paper surface is semi-specular or semi-retro-reflective where the reflection maintains high brightness but has a whiter or softer appearance to the viewer.

A combination of a front-lit, transparent surface, that is less diffusive (i.e. more specular) provides a display that reflects light and preserves the non-Lambertian output of the front light source leading to a brighter display.

FIG. 2 illustrates a frustratable TIR semi-retro-reflective display according to one embodiment of the disclosure. Display 100 of FIG. 2 is equipped with a directional front light system. Display 100 includes a semi-retro-reflective front sheet 102 having a plurality of partially embedded high refractive index transparent convex protrusions. The convex protrusions may be of varying design and shape depending on the application. In FIG. 2 the convex protrusions are in the shape of hemispherical beads 104 that extended inwardly. The display in FIG. 2 is further comprised of a transparent front electrode 106 on the inward surface of the hemispherical beads 104 and a rear support 108 equipped with a rear electrode 110. Rear electrode 110 may comprise a thin film transistor (TFT) array or a patterned electrode array.

Display 100 is also shown with voltage source 112 which connects front electrode 106 to rear electrode 110. Contained within the cavity formed by front electrode 106 and rear electrode 110 is an inert, low refractive index medium 114. Medium 114 may contain suspended electrophoretically mobile particles 116.

Display 100 may further include a directional front light system equipped with light source 118, light guide 120 and array of light extractor elements 122. In one embodiment, the front light source may be comprised of, but not limited to, a light emitting diode (LED), cold cathode fluorescent lamp (CCFL) or a surface mount technology (SMT) incandescent lamp.

The light guide directs light to the front entire surface of sheet 102 while the light extractor elements direct the light in a perpendicular direction towards the outward surface of the semi-retro-reflective sheet 102. It should be noted that the light guide comprising of extractor elements 122 illustrated in FIG. 2 is a conceptual drawing. In conventional light guide systems the extractor elements may be, but not limited to, embedded reflective elements or air pockets, wherein the reflection is caused by the mismatch of refractive index values at the interface between the light guide polymer material and the air pocket. Additionally, the size and location of the extractor elements may vary so as to cause a uniform extraction of the light. For all drawings herein that comprise a light guide system, the light guide system shown is intended to be illustrative for conceptual purposes only.

On the left side of the dotted line 126, display 100 shows a portion (or a pixel) of the display in the white or semi-retro-reflective state. In this state, particles 116 are moved under influence of applied voltage to rear electrode 110 such that TIR can occur at sheet 102. The TIR effect is illustrated by directional light rays 128 and 132 emitted by the front light source in a direction perpendicular to sheet 102. The light rays are totally internally reflected in a semi-retro-reflective manner instead of a Lambertian manner back towards the viewer 124 as illustrated by light rays 130 and 134, respectively, centered about a 30° half angle cone.

The right side of dotted line 126 depicts a portion (or pixel) of display 100 in the frustrated TIR dark state. In this state, electrophoretically mobile particles 116 are moved under the influence of an applied voltage of opposite polarity—as compared to the applied voltage on the left side of FIG. 2—near the surface of the transparent front electrode 106 such that TIR is frustrated. This is illustrated by directionally emitted light rays 136 and 138 being absorbed, for example, by particles 116 which are light absorbing.

FIG. 3 is a close-up view of the extractor elements 122 in light guide 120 of display 100 of FIG. 2. Specifically, FIG. 3 shows light source 118, light guide 120 and extractor elements 122. Extractor elements are structures within the light guide to extract light from said guide in a controllable manner. There are many ways to extract light from light guides. The depiction in FIG. 3 simply illustrates the concept.

FIG. 3 also shows a plurality of light rays 150 from light source 118 being reflected and re-directed into a respective plurality of reflected light rays 152 in a direction perpendicular to the semi-retro-reflective surface. The light rays are emitted and re-directed in a perpendicular direction within a non-Lambertian narrow angular range towards the semi-retro-reflective sheet.

Figure 4:
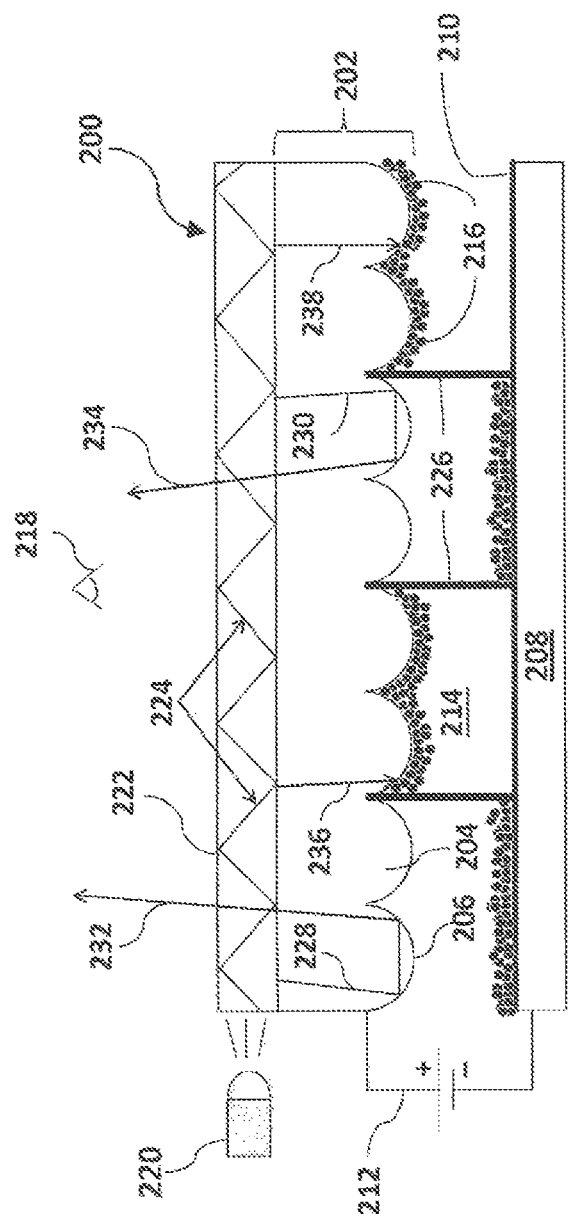
FIG. 4 illustrates an exemplary display according to another embodiment of the disclosure.

FIG. 4 shows an exemplary display according to another embodiment of the disclosure.

Specifically, FIG. 4 shows a portion of a frustratable TIR display equipped with a directional front light and cross-walls. Display 200 of FIG. 4 includes a semi-retro-reflective outer sheet 202 facing viewer 218 having a plurality of convex protrusions in the shape of hemispherical beads 204, transparent front electrode 206 on a surface of the hemispherical beaded surface, rear support 208 comprising of top conductive layer 210 acting as rear electrode in TFT or patterned electrode array, an optically clear, inert, low refractive index medium 214. Medium 214 fills the cavity formed between front transparent electrode 206 and rear electrode 210. Medium, 214 contains suspended light absorbing electrophoretically mobile particles 216.

Voltage source 212 connects front 206 and rear electrodes 210. Front light source 220 illuminates a surface of display 200. Light guide 222 and extractor elements 224 re-direct the light in a perpendicular direction towards semi-retro-reflective sheet 202.

Display 200 further comprises walls 226 which form wells or compartments for confining mobile particles 216. The walls or cross walls 226 may be configured to create wells or compartments in a variety of shapes. For example, the wells may be square-like, triangular, pentagonal, hexagonal or a combination thereof. Walls 226 may include a polymeric material and patterned by such techniques as photolithography, embossing or molding. Walls 226 help to confine the electrophoretically mobile particles 216 to prevent settling and migration of particles 216 which may lead to poor display performance over time.

Single or multiple pixels may be switched within the wells or compartments formed by the cross walls 226 as further shown in FIG. 4. For example, light rays 228 and 230 may be emitted by the front light source directionally in a perpendicular direction within a narrow angular range (i.e., non-Lambertian) toward semi-retro-reflective sheet 202. The light rays may undergo TIR and may be reflected as reflected rays 232 and 234, respectively, back toward viewer 218. The reflection substantially preserves the non-Lambertian characteristic of the light output of the directional front light to create a light or reflective state. This is made possible when voltage is applied such that particles 216 are moved and collected at rear electrode surface 210.

Alternatively, the polarity of the applied voltage may be reversed and particles 216 may move from rear electrode 210, toward transparent front electrode surface 206 such that light rays 236 and 238 are absorbed or scattered by particles 216 at single or multiple pixels. The pixels may be located within the compartments or wells created by cross walls 226 to create a dark state.

Figure 5:
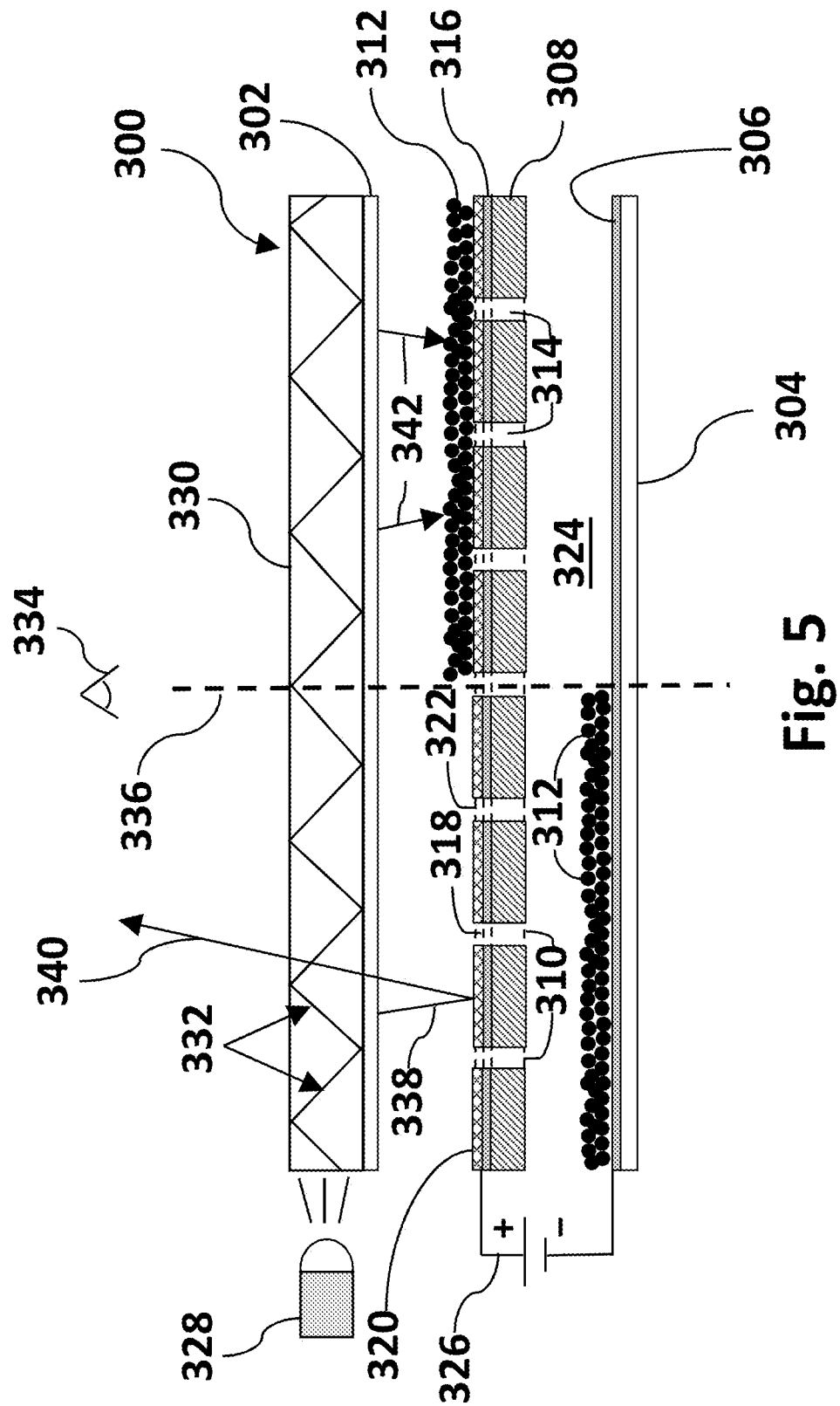
FIG. 5 illustrates an exemplary embodiment of the disclosure having a perforated sheet.

FIG. 5 illustrates another embodiment of the disclosure having perforated sheet. Here, instead of light being reflected at a semi-retro-reflective front sheet (e.g., FIGS. 2 and 4), light is reflected at a semi-specular or semi-retro-reflective surface on a perforated sheet or film. Display 300 includes transparent outer sheet 302. Sheet 302 may be optional and light guide 330 may be used as the only outer sheet. Display 330 also includes rear support 304 with a top conductive layer acting as rear electrode 306 which may include a TFT or a patterned array.

Disposed within a cavity formed between outer sheet 302 and rear electrode 306 is a thin, perforated, continuous (represented by the dotted lines 310) sheet or film 308. Sheet 308 may be formed of a track etched polymeric material such as polycarbonate, polyester, polyimide or some other polymeric material or glass with a thickness of at least about 10 microns. The perforated nature of film 308 allows light absorbing, electrophoretically mobile particles 312 to pass through perforations 314. An average diameter of the perforations in sheet 308 may be greater (e.g., about 10 times greater) than the average diameter of particles 312. The perforations in sheet 308 may constitute sufficiently large fraction (e.g., at least 10%) of the total surface area of membrane 308 to permit substantially unimpeded passage of particles 312 through perforations 314 of sheet 308.

Display 300 in FIG. 5 further shows an additional first perforated and continuous (represented by the dotted lines 318) conductive layer 316 acting as a front electrode on top of the perforated, continuous (represented by the dotted lines 310) film or sheet 308. The film or sheet may define a membrane. Perforations may also define pores or apertures. Layer 316 may include a transparent conductive material such as indium tin oxide (ITO) or Baytron™ or conductive nanoparticles dispersed in a polymer matrix or a combination thereof. In one embodiment, layer 316 includes a thin, light reflective, metal layer such as aluminum, silver, gold, aluminized Mylar™ flexible film or other conductive material to enhance reflectance. Reflective layer 316 may be assembled by coating surface 308 with a reflective (e.g., aluminum, silver, gold) metallic film using conventional vapor deposition techniques.

A second perforated and continuous (represented by the dotted lines 322) layer 320 may be formed on top of layer 316. Second layer 320 may include a semi-retro-reflective coating 320. The semi-retro-reflective coating 320 may be comprised of corner-cube or partial corner-cube reflectors or glass beads embedded in a reflective substrate such as the reflective front electrode 316 or in a transparent matrix and backed by the reflective front electrode 316.

In one embodiment, the diffuse reflectance level from semi-retro-reflective coating 320 is not so high as to cause pixel or sub-pixel cross-talk. For example, if light enters through one sub-pixel it should be reflected by semi-retro-reflective coating 320 such that light exits through the same sub-pixel, otherwise the contrast and/or color saturation will be reduced. The cavity formed by front transparent sheet 302 and rear electrode 306 along with the perforations of the perforated sheet is filled with an optically clear and inert medium 324 in which particles 312 are suspended.

Voltage source 326 may apply a bias between the conductive first layer 316 on perforated film 308 and rear electrode 306. In conventional display architectures where a reflective metal perforated layer or film is interposed between two electrode surfaces (i.e., top and bottom electrodes), the metal film is an equipotential surface which is uncontrolled and can take any value of voltage between the voltages in the top and bottom electrodes. The precise voltage depends on the charge distribution across the entire cell. Having a variable voltage on an unconnected electrode means that the cell performance will have variable operation speeds and hysteresis. Experimental data shows that such an architecture renders the device inoperable. One solution to the conventional architecture's shortcomings is to electrically connect the reflective perforated metal layer to the rear electrode such that said reflective perforated metal layer becomes the front electrode layer as described in the disclosed embodiments.

Display 300 further comprises directional front light source 328, a transparent light guide 330 and light extractor elements 332. Light extractor elements 332 redirects emitted light from light source 328 in the perpendicular direction in a narrow angular range towards the reflective layer 320 on the perforated film surface.

In the light state, the light is reflected back in a narrow angular range back to viewer 334. This is depicted on the left-hand side of dotted line 336. Here, a voltage bias of the correct polarity has been applied such that electrophoretically mobile particles 312 move through perforations 314 of the perforated sheet (and conductive and reflective layers) toward rear electrode 306 such that particles collect at the surface thereof. When particles 312 are positioned behind perforated sheet 308, a light state is created. Light ray 338 emitted in the perpendicular direction from the light guide 330 is reflected at the semi-retro-reflective surface 320 back toward viewer 334 such that the reflected light (represented by reflected light ray 340) preserves the non-Lambertian characteristic of the light output to thereby minimize the amount of light not directed back to the viewer 334.

On the right-hand side of dotted line 336, FIG. 5 shows a dark state such that particles 312 are moved through the perforations 314 under the influence of a voltage bias of opposite polarity. In this state, particles 312 collect at the surface of the semi-retro-reflective layer 320 so as to absorb light rays emitted from the light guide 330. This is represented by light rays 342 being absorbed by particles 312.

Display 300 may further comprise one or more walls as shown in FIG. 4. Each well may create a compartment to confine the electrophoretically mobile particles 312 in display 300. The walls or cross walls may be designed so as to create wells or compartments in any of the shapes discussed above. The walls may be formed of polymeric material and may be patterned by such techniques as conventional photolithography, embossing or molding. The walls help confine particles 312 and prevent settling and migration of particles 312 which leads to poor display performance over time.

Figure 6:
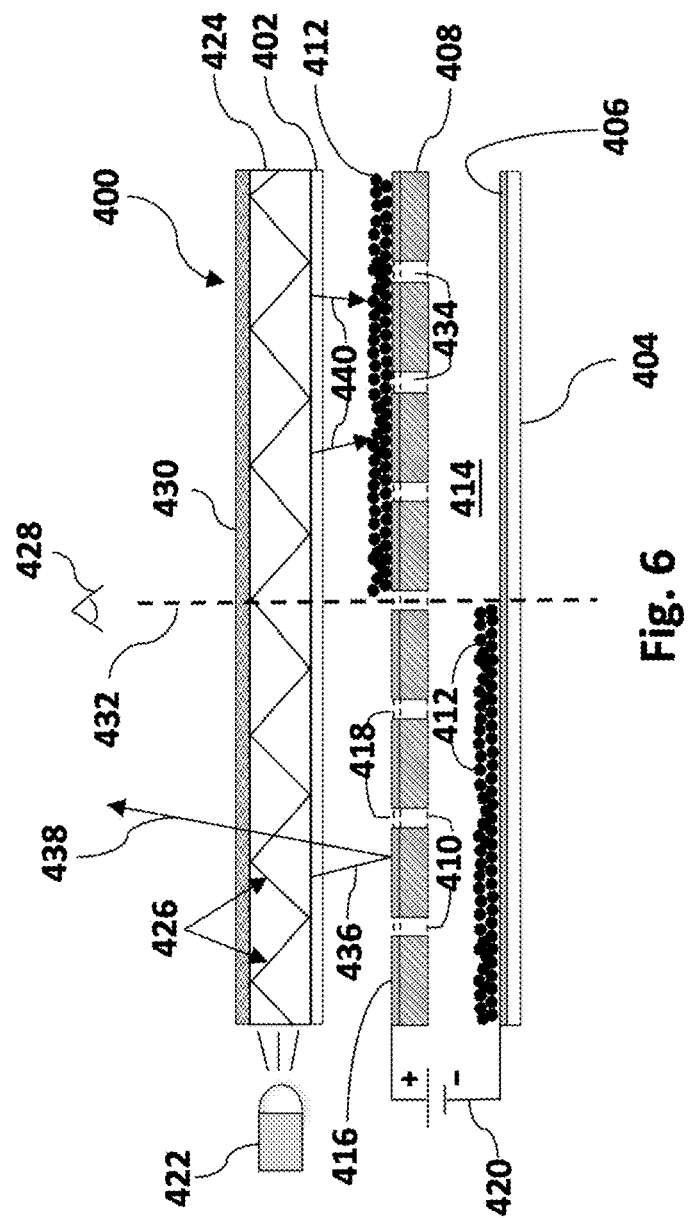
FIG. 6 illustrates an exemplary embodiment of the disclosure having a perforated sheet and a conductive specularly reflective layer.

Another embodiment of a reflective display with a directional front light is shown in display 400 of FIG. 6. Display 400 includes an optional transparent front sheet 402, rear support 404, rear electrode 406 in a TFT or patterned array, a perforated, continuous (represented by the dotted lines 410) sheet or film 408, and electrophoretically mobile particles 412 suspended in an optically clear, inert medium 414.

An additional specularly reflective, conductive perforated (represented by the dotted lines 418 to imply a continuous layer) layer 416 is added on top of the perforated sheet such that the reflective conductive layer faces transparent outer sheet 402 to act as a front electrode. Reflective layer 416 may define a thin light reflective metal layer such as aluminum, silver, gold, aluminized Mylar™ flexible film or other similar material. Reflective layer 416 may be assembled by coating surface 408 with a reflective (e.g., aluminum, silver, gold) metallic film using standard vapor deposition techniques. Display 400 further comprises a voltage source 420 to apply voltage bias across the front and rear electrodes to move the electrophoretically mobile particles 412. The exemplary embodiment of FIG. 6 also includes directional front light system comprising light source 422 and transparent light guide 424 equipped with light extractor elements 426. On top of the light guide surface and disposed between the light guide 424 and viewer 428 is light diffusing layer 430. There are a number of possibilities for the materials of construction for light diffusing layer 430 such as ground, grey-eyed or opal glass diffusers and Teflon™ or other conventional polymeric diffusers.

The embodiment of display 400 operates, for example, in the following manner. On the left side of the dotted line 432, electrophoretically mobile particles are moved through perforations 434 to rear electrode surface 406 under an applied voltage. Light rays 436 that are emitted directionally from front light guide 424 in a perpendicular direction are reflected in a specular manner as shown by reflected light ray 438 by the reflective and conductive layer 416 on top of the perforated sheet or film 408 such that the reflected light substantially maintains and preserves the non-Lambertian characteristics of light output from front light guide 424.

As the light ray escapes the display and back to the viewer 428 through transparent light guide 424, light ray 438 passes through the outer transparent light diffuser sheet 430 in order to soften or whiten the light so that the light state of the display appears paper-like. The degree of softening can be controlled by the characteristics of the light diffuser layer and requirements of the application.

On the right side of the dotted line 432, the mobile particles 412 are moved through perforations 434 to a top surface of reflective electrode 416 such that directional light rays emitted by the front light source are absorbed thereby. This creates a dark state and is shown by light rays 440 emitted by the front light source which are absorbed by the electrophoretically mobile particles 412.

Display 400 may further comprise walls as illustrated in display 200 in FIG. 4. The walls create wells or compartments that confine electrophoretically mobile particles 412. The walls help confine mobile particles 412 to prevent settling and migration of particles 412 which leads to poor display performance.

Figure 7:
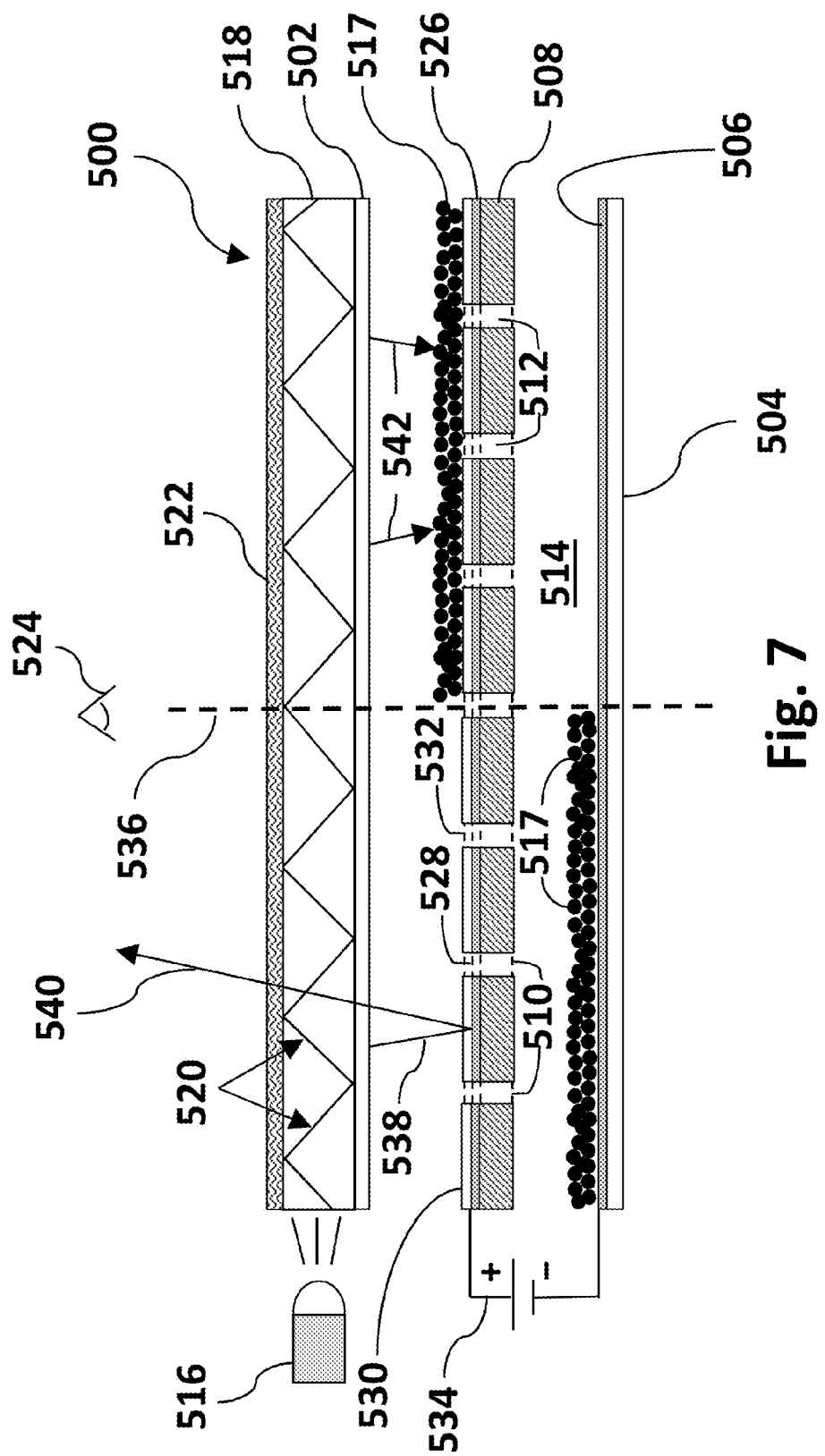
FIG. 7 illustrates an exemplary embodiment of the disclosure having a perforated sheet with a reflective layer.

FIG. 7 illustrates an exemplary embodiment of the disclosure having a perforated sheet with a reflective layer. Display 500 of FIG. 7 is similar in construction to display 400 of FIG. 6. Display 500 includes an optional transparent outer sheet 502, rear support 504, rear electrode 506 that may be a TFT or patterned array, perforated and continuous (represented by the dotted lines 510) sheet or film 508 with perforations, pores or apertures 512, optically clear and inert medium 514 filling the cavity formed between transparent outer sheet 502 (the sheet may be optional as the light guide may be used as a transparent outer sheet) and rear electrode 506 and contained within the perforations 512.

Display 500 also includes front light source 516, transparent light guide 518 equipped with array of light extractor elements 520 and transparent light diffuser sheet 522 located on top of transparent light guide 518 and facing viewer 524. Display 500 further comprises a first perforated, continuous (represented by the dotted lines 528) reflective layer 526 on perforated sheet 508. On top of perforated reflective layer 526 is a second transparent conductive, perforated and continuous (represented by the dotted lines 532) layer 530. This layer 530 acts as front electrode and may be constructed from ITO or Baytron™ or nanoparticles such as nanometallic wires dispersed in a polymer matrix or a combination thereof. Display 500 further comprises voltage source 534 for applying a bias for moving electrophoretically mobile particles 517.

In an exemplary embodiment, display 500 operates in the following manner. On the left-hand side of dotted line 536, particles 517 are moved through perforations 512 to rear electrode surface 506 under an applied voltage bias. Light rays depicted by ray 538 are emitted directionally by the light guide 518 in a perpendicular direction. The light rays pass through transparent conductive layer 530 which acts as the front electrode. The light rays are reflected in a specular manner as shown by reflected light ray 540 by the reflective layer 526 on top of the perforated sheet or film 508 such that the reflected light substantially maintains and preserves the non-Lambertian characteristic of the light output from the front light source. As reflected light ray 540 escapes display 500 back to the viewer 524 through the transparent light guide 518, the light ray passes through the outer transparent light diffuser sheet 522 (this may be an optional feature of the display) in order to soften or whiten the light such that the light state of the display appears paper-like. The degree of softening may be controlled by the characteristics of light diffuser layer 522 and the display requirements.

On the right side of the dotted line 524, the electrophoretically mobile particles 517 are moved through perforations 512 to a top surface of transparent front electrode 530 such that directional light rays emitted by the light guide are absorbed by the particles. This creates a dark state as shown by light rays 542 emitted by the light guide and absorbed by particles 517.

While not shown, display 500 may further comprise walls as discussed in relation to FIG. 4. The walls (not shown) create wells or compartments to confine mobile particles 517 in the display. The walls help confine mobile particles 517 to prevent settling and migration of particles 517 which leads to poor display performance.

The disclosed embodiments may be used in such applications as electronic book readers, portable computers, tablet computers, cellular telephones, smart cards, signs, watches, wearables, shelf labels, flash drives and outdoor billboards or outdoor signs comprising a display.

While the principles of the disclosure have been illustrated in relation to the exemplary embodiments shown herein, the principles of the disclosure are not limited thereto and include any modification, variation or permutation thereof.

The invention claimed is:

1. A reflective display device, comprising:
   a semi-retro-reflective display sheet having one or more convex protrusions to reflect light in a narrow angle relative to the direction of the incident light;
   a light guide;
   a light source to emit light to the light guide, the light guide configured to redirect light in a substantially perpendicular direction towards a surface of the semi-retro-reflective display sheet;
   a front electrode;
   a rear electrode;

an optically transparent fluid disposed between the front and the rear electrodes; and a plurality of electrophoretically mobile particles suspended in the optically transparent fluid.

2. The display device of claim 1, wherein the light source defines a light emitting diode (LED), cold cathode fluorescent lamp (CCFL) or a surface mount technology (SMT) incandescent lamp.

3. The display device of claim 1, wherein the front electrode is transparent and disposed on the semi-retro-reflective display sheet.

4. The display device of claim 1, wherein the rear electrode further comprises a thin film transistor or driven patterned array.

5. The display device of claim 1, further comprising a voltage source to provide:

a first voltage to move substantially all of the electrophoretically mobile particles toward the rear electrode to allow incident rays to be totally internally reflected at the semi-retro-reflective display sheet towards the viewer; and a second voltage to move substantially all of the electrophoretically mobile particles toward the front electrode and collect at the semi-retro-reflective surface to thereby frustrate total internal reflection.

6. The display device of claim 1, further comprising one or more cross walls.

7. The display device of claim 1, wherein the front light and the semi-retro-reflective display sheet are arranged relative to each other to provide a substantially non-Lambertian light display.

8. The display device of claim 1, wherein the narrow angle defines an angle in the range of about 10° to about 30°.

9. The display device of claim 1, wherein the light source and light guide are internal to the reflective display device.

10. The display device of claim 9, wherein the light guide is configured to selectively redirect light in a direction substantially perpendicular to the surface of the outward sheet of the display.

11. The display device of claim 1, wherein the light guide further comprises light extractor elements.

12. A reflective display, comprising:
a transparent outer sheet;
a light guide;
a light source to emit light into the light guide, the light guide configured to redirect light in a substantially perpendicular direction-towards a surface of the transparent outer sheet;
a rear electrode;
a perforated sheet situated between the light source and the rear electrode;
a front electrode disposed over the perforated sheet;
a semi-retro-reflective surface over the perforated sheet;
a medium disposed within the cavity formed between the transparent outer sheet and the rear electrode; and
a plurality of electrophoretically mobile particles suspended in the medium.

13. The display device of claim 12, further comprising one or more cross walls.

14. The display device of claim 12, wherein the light source, the light guide and the semi-retro-reflective surface are arranged relative to each other to provide a substantially non-Lambertian light display.

15. The display device of claim 12, wherein the rear electrode further comprises a thin film transistor or driven patterned array.

16. The display device of claim 12, further comprising a voltage source to communicate with the front and the rear electrodes to selectively move the electrophoretically mobile particles in the fluid, wherein the voltage source provides:

a first voltage to move substantially all of the electrophoretically mobile particles toward the rear electrode to allow incident rays to be reflected at the semi-retro-reflective display sheet towards the viewer; and a second voltage to move substantially all of the electrophoretically mobile particles toward the front electrode and collect at the semi-retro-reflective surface to thereby absorb incident rays.

17. The display device of claim 12, wherein the light guide further comprises light extractor elements.

18. A reflective display device, comprising:
a transparent outer sheet;
a light guide;
a light source to emit light into the light guide, the light guide to redirect light in a substantially perpendicular direction towards a surface of the transparent outer sheet;
a rear electrode;
a perforated sheet situated between the light guide and the rear electrode;
a reflective layer disposed over the perforated sheet;
a transparent front electrode disposed over the perforated sheet;
a medium disposed within the cavity formed between the transparent outer sheet and the rear electrode; and
a plurality of electrophoretically mobile particles suspended in the medium.

19. The display device of claim 18, further comprising one or more cross walls.

20. The display device of claim 18, wherein the light source and the semi-retro-reflective surface are arranged relative to each other to provide a substantially non-Lambertian light display.

21. The display device of claim 18, wherein the rear electrode further comprises a thin film transistor or driven patterned array.

22. The display device of claim 18, wherein the transparent front electrode is comprised of ITO or Baytron™ or electrically conductive particles dispersed in a polymer matrix or a combination thereof.

23. The display device of claim 18, further comprising a voltage source to communicate a bias with the front and the rear electrodes to selectively move the electrophoretically mobile particles in the fluid, wherein the voltage source provides:

a first voltage to move substantially all of the electrophoretically mobile particles toward the rear electrode to allow incident rays to be reflected at the semi-retro-reflective display sheet towards the viewer; and a second voltage to move substantially all of the electrophoretically mobile particles toward the front electrode and collect at the semi-retro-reflective surface to thereby absorb incident rays.

24. The display device of claim 18, wherein the light guide further comprises light extractor elements.

* * * * *